United States Patent
Schechner et al.

(10) Patent No.: US 9,583,111 B2
(45) Date of Patent: Feb. 28, 2017

(54) EXAMPLE-BASED AUDIO INPAINTING (71) Applicant: TECHNION RESEARCH AND DEVELOPMENT FOUNDATION LTD., Haifa (IL)

(72) Inventors: Yoav Schechner, Kiryat Bialik (IL); Michael Elad, Kiriat Tivon (IL); Yuval Bahat, Tel Aviv (IL)

(73) Assignee: Technion Research & Development Foundation Ltd., Haifa (IL)

( * ) Notice: Subject to any disclaimer, the term of this patent is extended or adjusted under 35 U.S.C. 154(b) by 153 days.

(21) Appl. No.: 14/332,913

(22) Filed: Jul. 16, 2014

(65) Prior Publication Data

US 2015/0023345 A1  Jan. 22, 2015

Related U.S. Application Data (60) Provisional application No. 61/847,116, filed on Jul. 17, 2013.

(51) Int. Cl.
*H04M 7/00* (2006.01)
*G10L 19/005* (2013.01)
*G10L 15/02* (2006.01)
*G10L 19/02* (2013.01)

(52) U.S. Cl.
CPC ............ *G10L 19/005* (2013.01); *G10L 15/02* (2013.01); *G10L 19/0212* (2013.01)

(58) Field of Classification Search
None
See application file for complete search history.

(56) References Cited

U.S. PATENT DOCUMENTS

2011/0191111 A1*  8/2011  Chu ................. G10L 19/005
704/500

OTHER PUBLICATIONS

A. Adler, V. Emiya, M. Jafari, M. Elad, R. Gribonval, and M. Plumbley, "Audio inpainting," Audio, Speech, and Language Processing, IEEE Transactions on, vol. 20, No. 3, pp. 922-932, Mar. 2012.
D. T. Chappell and J. H. Hansen, "A comparison of spectral smoothing methods for segment concatenation based speech synthesis," Speech Communication, vol. 36, No. 34, pp. 343-373, 2002.
J. Suzuki and M. Taka, "Missing packet recovery techniques for low-bit- rate coded speech," Selected Areas in Communications, IEEE Journal on, vol. 7, No. 5, pp. 707-717, Jun. 1989.
Facial tracking algorithm called "FaceTracker" available online at https://github.com/kylemcdonald/FaceTracker (Saragih et al. 2010, Python wrapping by Amit Aides).
D. Segev, Y. Schechner, and M. Elad, "Example-based cross-modal denoising," in Computer Vision and Pattern Recognition (CVPR), 2012 IEEE Conference on, Jun. 2012, pp. 486-493.

* cited by examiner

*Primary Examiner* — Vinncelas Louis
(74) *Attorney, Agent, or Firm* — Roach Brown McCarthy & Gruber, P.C.; Kevin D. McCarthy (57) ABSTRACT

A method for packet loss concealment, that includes: continuously receiving a digital audio stream; extracting audio features from the digital audio stream while the digital audio stream is unharmed; and upon detecting a gap in the digital audio stream, filling the gap with one or more previous segments of the digital audio stream, wherein the filling is based on a matching of the one or more of the extracted audio features with one or more audio features adjacent to the gap.

18 Claims, 7 Drawing Sheets

EXAMPLE-BASED AUDIO INPAINTING

FIELD OF THE INVENTION

The invention relates to example-based audio inpainting.

BACKGROUND

Voice over internet protocol (VoIP) systems have become a basic tool with ever-growing popularity. However, they commonly rely on an unreliable communication channel, such as the internet, and are subject to frequent events of data loss. These events are usually realized in the form of lost data packets carrying audio information. This, in turn, leads to temporal gaps in received audio sequences. Left untreated, gaps create breaks in the audio (e.g. missing syllables in speech signals). High percentage of packet loss (for example, above 20%) can often render speech unintelligible.

Figure 1A:
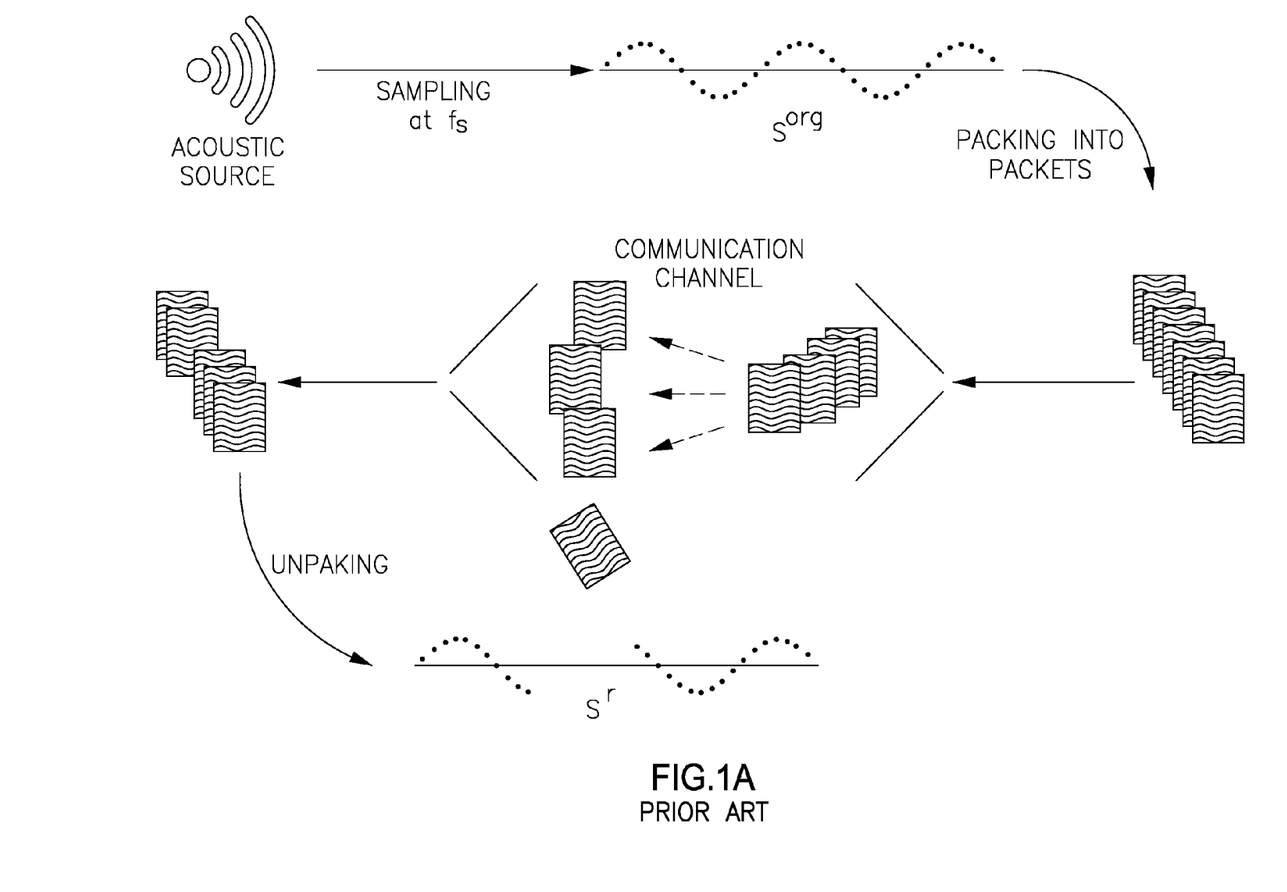
FIG. 1A shows a VoIP system overview, in accordance with prior art.

FIG. 1A illustrates a VoIP system overview, in accordance with prior art. An acoustic signal is sampled at frequency $f_s$, yielding $s^{org}$. It is then divided to packets, transmitted over an unreliable communication channel. Packets reaching their destination form $s^r$. Some packets are dropped during transmission, causing $s^r$ to have sequences of missing samples.

For this reason, VoIP applications regularly incorporate a packet loss concealment (PLC) mechanism, to counter the degradation in audio quality. Many existing techniques have difficulties handling long audio gaps.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for packet loss concealment, comprising: continuously receiving a digital audio stream; extracting audio features from the digital audio stream while the digital audio stream is unharmed; and upon detecting a gap in the digital audio stream, filling the gap with one or more previous segments of the digital audio stream, wherein said filling is based on a matching of the one or more of the extracted audio features with one or more audio features adjacent to the gap.

There is further provided, in accordance with an embodiment, an apparatus comprising: a speaker; a network interface module; and at least one hardware processor configured to: continuously receive a digital audio stream using said network interface module, extract audio features from the digital audio stream while the digital audio stream is unharmed, upon detecting a gap in the digital audio stream, synthesize a restored digital audio signal by filling the gap with one or more previous segments of the digital audio stream, wherein said filling is based on a matching of the one or more of the extracted audio features with one or more audio features adjacent to the gap, and sounding the restored digital audio signal using said speaker.

There is further provided, in accordance with an embodiment, a method for packet loss concealment, comprising using at least one hardware processor for filling a gap in a digital audio stream with previously received audio of the digital audio stream, to produce a perceptually-acceptable digital audio output, wherein said filling is based on feature matching between audio adjacent to the gap and the previously received audio.

In some embodiments, said matching is based on prior statistics of the digital audio stream.

In some embodiments, the prior statistics comprise a probability distribution of temporal syllable sequences.

In some embodiments, the method further comprises dividing the digital audio stream into consecutive segments.

In some embodiments, the consecutive segments are partially-overlapping.

In some embodiments, the method further comprises clustering the consecutive segments, wherein said clustering is to a number of clusters based syllable types.

In some embodiments, the number of clusters is between 250 and 350.

In some embodiments, the method further comprises dividing each of the consecutive segments into audio tiles according to mel frequency cepstral coefficients (MFCC).

In some embodiments, said filling of the gap comprises synthesizing a restored digital audio signal by adjusting pitch and gain values of the one or more audio features adjacent to the gap.

In some embodiments, said synthesizing further comprises preventing discontinuities in the restored digital audio signal by synthesizing a gradual transition at edges of the gap.

In some embodiments, said digital audio stream comprises speech.

In some embodiments, said digital audio stream is comprised within a digital video stream; the method further comprises extracting visual features from the digital video stream; and said filling is further based on a matching of the one or more of the extracted visual features with one or more visual features.

In some embodiments, said at least one hardware processor is further configured to divide the digital audio stream into consecutive, segments.

In some embodiments, said at least one hardware processor is further configured to cluster the consecutive segments, wherein the cluster is to a number of clusters based syllable types.

In some embodiments, the number of clusters is between 250 and 350.

In some embodiments, said at least one hardware processor is further configured to divide each of the consecutive segments into audio tiles according to mel frequency cepstral coefficients (MFCC).

In some embodiments, the gap is at least 20 ms (milliseconds) long.

In some embodiments, the gap is at least 30 ms long.

In some embodiments, the gap is at least 40 ms long.

In some embodiments, the perceptually-acceptable digital audio output has a mean opinion score (MOS) of 2.5 or more.

In some embodiments, the perceptually-acceptable digital audio output has a mean opinion score (MOS) of 3 or more.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method and apparatus for packet loss concealment in a digital audio stream are disclosed herein. The concealment is also referred to as "inpainting", a term used in the context of filling in a missing area in an image but recently borrowed by Adler et al. to describe filling in short audio gaps in a signal. See A. Adler, V. Emiya, M. Jafari, M. Elad, R. Gribonval, and M. Plumbley, "Audio inpainting," Audio, Speech, and Language Processing, IEEE Transactions on, vol. 20, no. 3, pp. 922-932, March 2012.

Advantageously, the method and apparatus are capable, in some embodiments, of effectively concealing relatively long gaps resulting from packet loss, such as gaps having a length of approximately 20 milliseconds (ms) or longer.

The method and apparatus, according to some embodiment, may be employed in a VoIP system environment, such as VoIP calls carried out using personal computers, portable computers, smart phones, tablet computers and/or the like. Such an apparatus for carrying out the present method, in accordance with some embodiments, may include at least one hardware processor configured to execute the method, as well as a hardware network interface module for receiving a digital audio stream and a speaker for sounding the stream.

Figure 1B:
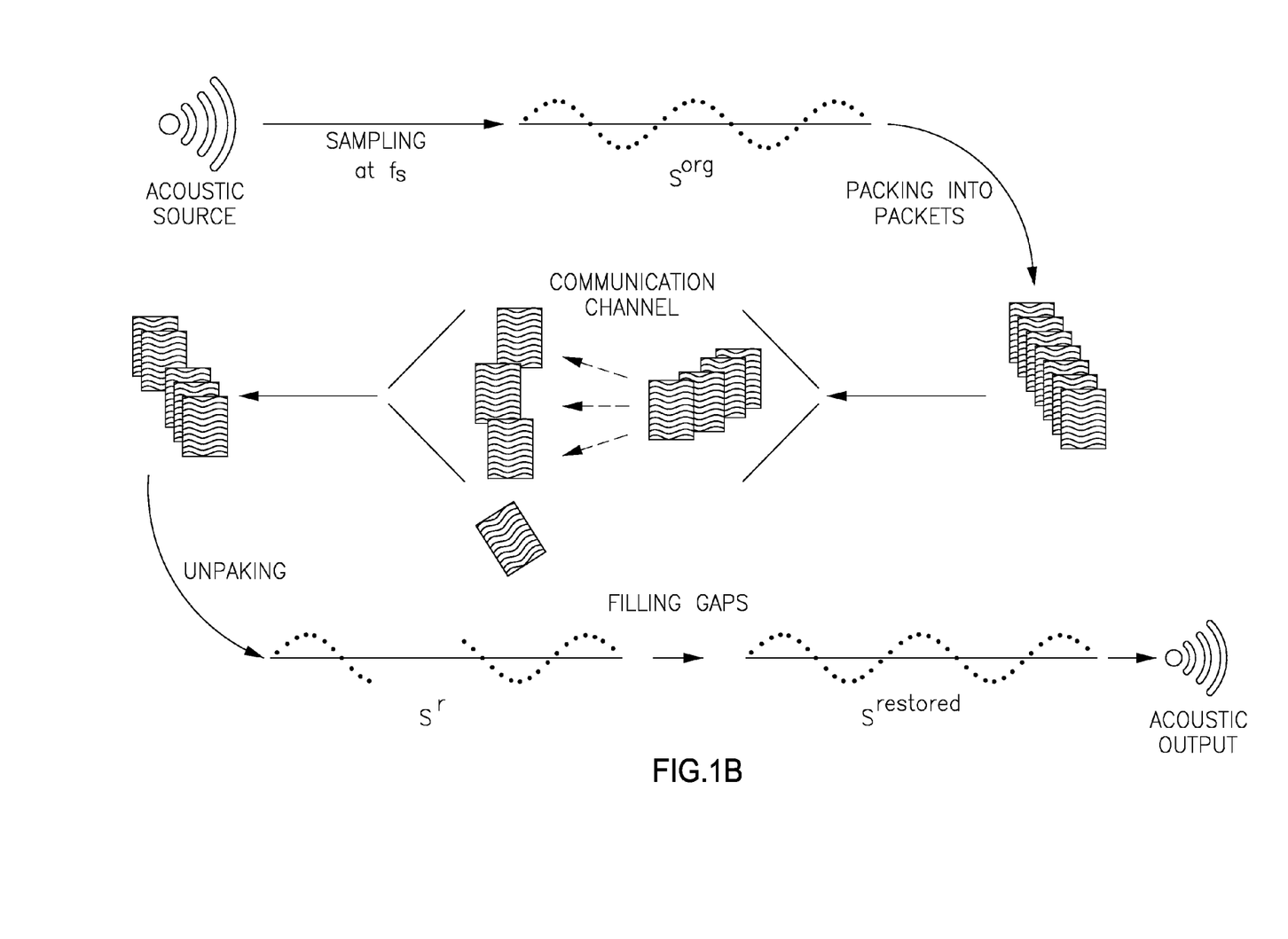
FIG. 1B shows a VoIP system overview, in accordance with some embodiments.

FIG. 1B illustrates a VoIP system overview, in accordance with present embodiments. Similar to FIG. 1A, an acoustic signal is sampled at frequency $f_s$, yielding $s^{org}$. It is then divided to packets, transmitted over an unreliable communication channel. Packets reaching their destination form a digital audio stream $s^r$, which is continuously received at a receiver side. Some packets are dropped during transmission, causing $s^r$ to have sequences of missing samples (or "gaps"). The gaps are then filled in accordance with present methods, and a restored signal $s^{restored}$ may be sounded acoustically using one or more speakers.

The method and apparatus, according to some embodiment, are founded on an advantageous example-based approach, which addresses the packet loss problem by filling in missing data using examples taken from prior recorded audio of the same user. Namely, previously-recorded speech of a user is used for concealing gaps in currently-received speech of the same user. Once an audio gap is encountered, the present method and apparatus may harnesses audio data surrounding this gap to look for the most suitable audio example to fill this gap. A mixture of audio features and prior knowledge on the statistical nature of the audio signal may be used for finding this suitable example. Once found, one or more techniques are applied for finding and pre-processing the exact portion of audio extracted from the chosen example. This portion is smoothly inlaid to fill the audio gap. Experiments demonstrate the effectiveness of the example-based approach, including cases of large data gaps.

Network Packet Loss

The building block of VoIP is an internet packet. A packet encapsulates segments of a digital audio signal. Let $L^{packet}$ be the number of audio samples carried by each packet. Packets have various sizes, which correspond to various values of $L^{packet}$. Such packets often get dropped, resulting in a loss of the encapsulated data they carry. Packet losses are often the result of a deliberate packet dropping (by either the transmitting or the receiving side) during network congestion. The number of lost audio samples is $$N^{samples} = pL^{packet}, \qquad (1)$$

where p is the number of lost packets, which is proportional to the packet loss probability in the channel.

However, long gaps are common. The Gilbert model for internet packet loss implies that packet dropping tends to occur in bursts, mainly when network congestion is experienced. See G. Hasslinger and O. Hohlfeld, "The gilbert-elliott model for packet loss in real time services on the internet," Measuring, Modelling and Evaluation of Computer and Communication Systems (MMB), 2008 14th GI/ITG Conference, pp. 1-15, 31 2008—Apr. 2, 2008. This model fits packet loss statistics rather accurately.

Using the Gilbert model with standard parameters (for example, those of W. Jiang and H. Schulzrinne, "Modeling of packet loss and delay and their effect on real-time multimedia service quality," in Proceedings of Nossdav, 2000) suggests two important characteristics, which are taken into consideration in some present embodiments:

1. Dropping bursts of more than 5 consecutive packets are highly improbable, even in a poor quality communication channel.

2. When dealing with larger packet sizes (corresponding to longer encapsulated audio segments), gaps longer than 40 milliseconds are highly probable.

Outline of the Present Method

Figure 2:
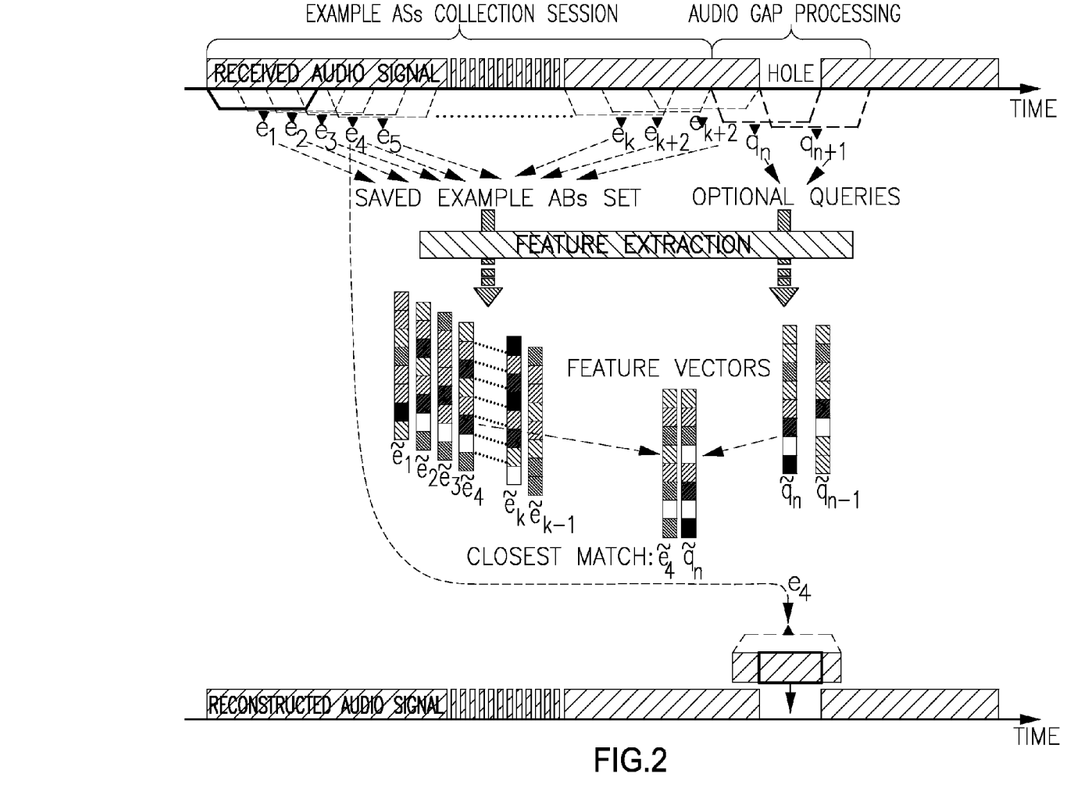
FIG. 2 shows an illustrated flow chart of a method for packet loss concealment, in accordance with some embodiments.

Reference is now made to FIG. 2, which shows an illustrated flow chart of a method (also "process" or "algorithm") for packet loss concealment, in accordance with some embodiments. The method starts by continuously receiving a digital audio stream (or "signal"). This digital audio stream may be divided on the fly into overlapping segments of constant length. These segments are termed here audio blocks (ABs). Each AB undergoes a feature extraction process, which yields a feature vector representative of this AB.

While this digital audio stream is unharmed (i.e. packets were not dropped), these ABs are saved to be used as examples at a later stage. Once a packet is dropped, the received audio segment has a missing sequence of audio samples, namely—a gap in the digital audio stream. This missing sequence is referred to as a hole (or a "gap") in all (partially overlapping) ABs that contain this sequence (queries $q_n$ and $q_{n+1}$ in FIG. 2).

The query ABs that contain the hole may then become a set of optional queries, in a task to fill in this hole. The unharmed portions inside these queries, which are adjacent to the gap, undergo a feature extraction process, similar to the one applied to example ABs. This process yields query feature vectors, which are comparable to example feature vectors. For each optional query, several examples are then found, that have the most resembling feature vectors, out of all prior examples. This collection of examples constitute a list of potential matches for this hole. Namely, one or more previous segments of the digital audio stream may be used for filling the hole. Out of this list of potential matches, the most suitable example(s) to fill the hole are picked, relying on prior statistics.

Finally, one or more techniques are used to inlay the selected example into the hole. By this, the aim is to reduce artifacts and increase intelligibility. The following sections describe the present method in further detail.

Problem Formulation

The problem dealt with involves an audio signal broadcast over an unreliable communication channel, such as a wired or a wireless network connected to a wide area network (WAN) such as the Internet and/or to a local area network (LAN). Some data is lost on the way (See FIG. 1B). This results in a pierced audio sequence, i.e. having temporal gaps. The original, unharmed signal $s^{org}$ is digital audio, sampled at frequency $f_s$ from an acoustic waveform. The received digital audio signal $s^r$ is corrupted by missing data segments, but it also contains unpierced intact time spans.

A temporal segment of samples in $s^r$ is hereby termed an AB (audio block). Each AB is $L^{AB}$ samples long, corresponding to $N^{packets}$ consecutive packets. Then, $$L^{AB} = N^{packets} L^{packet}, \quad (2)$$

where $N^{packets}$ is an integer. Restricting $N^{packets}$ to an integer value sets the segment contained in an individual packet to serve as the smallest 'building block'. Shorter segments may contain too little information for signal analysis.

Figure 3:
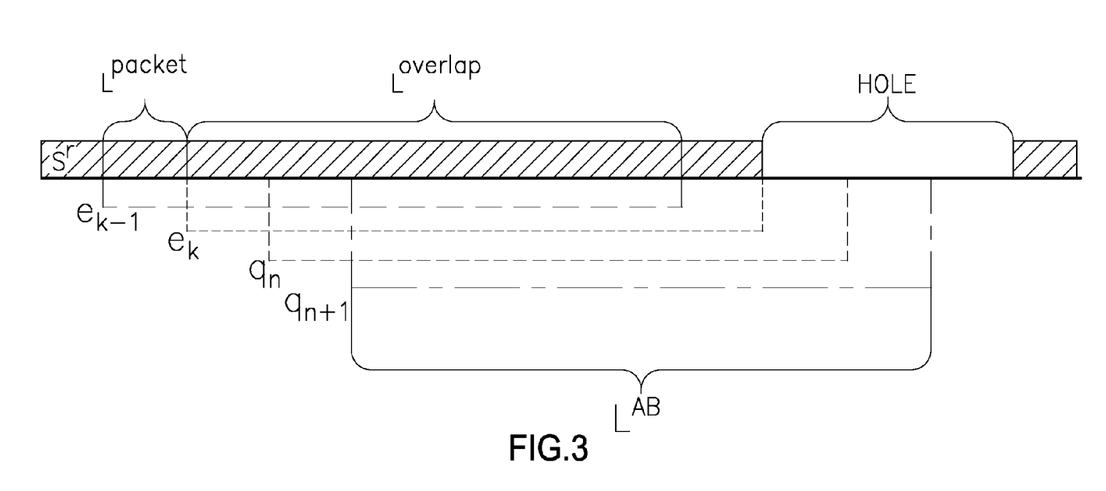
FIG. 3 shows a chart of example and query AB extraction, in accordance with some embodiments.

The streaming signal $s^r$ is divided on the fly into partly overlapping ABs, as depicted in FIG. 3. The overlap between two consecutive ABs is an integer number of packets, $$N^{overlap} \in [0 \ldots N^{packets}-1]. \quad (3)$$

For example, $N^{overlap} = N^{packets}-1$, in order to maximize the density of ABs. However, this integer number may be different.

The overlap is therefore $$L^{overlap} = N^{overlap} L^{packet} \quad (4)$$

samples long.

FIG. 3 shows a diagram of example and query AB extraction: Examples $e_k$ and $e_{k-1}$ are intact ABs extracted from $s^r$. Query ABs $q_n$ and $q_{n+1}$ have missing portions. Here a hole is created by three consecutive lost packets ($p_m=3$). The number of audio samples in one packet is $L^{packet}$. There are $L^{overlap}$ sample in the overlap between consecutive ABs.

Example AB

An undamaged AB is an example AB. The $k^{th}$ example AB is denoted by $e_k$. Let $i_k$ index the first sample in $e_k$. A sample of $s^r$ that corresponds to $i_k$ is $s^r(i_k)$. Then, $$e_k = [s^r(i_k), s^r(i_k+1), \ldots s^r(i_k+L^{AB}-1)] \quad (5)$$

Here $s^r = s^{org}$, since example ABs are unpierced. Let $N_E(\tau)$ be the number of unpierced ABs, which have appeared in the audio stream up to the current time $\tau$. Then $$E_\tau = \{e_k\}_{k=1}^{N_E(\tau)} \quad (6)$$

is the unpierced set of ABs which were captured up to this time.

Query AB

A hole is caused by at least one missing packet. Holes pierced in $s_r$ are indexed by m, in order of appearance. There are usually less holes than missing packets, because some holes are created by a sequence of consecutive lost packets.

An AB that has some missing data, denoted $q_n$ (see FIG. 3), is a query AB. Analogously to the definition in Eq. (5), let $i_n$ index the first sample in $q_n$. Then, $$q_n = [s^r(i_n), s^r(i_n+1), \ldots s^r(i_n+L_{AB}-1)] \quad (7)$$

In a query AB, some samples are missing, along with their encapsulating packets. Let $p_m$ be the number of consecutive missing packets that form the $m^{th}$ hole. The number of consecutive missing samples, $N_m^{samples}$, in the $m^{th}$ hole is then $$N_m^{samples} = p_m L^{packet} \quad (8)$$

These $N_m^{samples}$ missing samples are equivalent to a gap in the audio signal, $N_m^{samples}/f_s$ seconds long. From this point onwards, the term 'packet' will refer also to the segment of audio samples contained inside the packet.

In order for a query AB to be usable, it has to have some of its data intact (see Sec. 3). Therefore, the query length may be set to be longer than the maximal probable hole length:

$$N_{packets} > p_m \quad (9)$$

These intact portions of $q_n$ are denoted by $q_n^{int}$. The present algorithm uses only $q_n^{int}$, since the data in other portions of $q_n$ was lost.

Each AB (either example or query) is pre-processed to yield audio feature vector:

$$\tilde{e}_k = P(e_k), \quad \tilde{q}_n = P(q_n^{int}) \quad (10)$$

The resulting example feature vectors comprise the set $\tilde{E}_\tau$, corresponding to the set defined in Eq. (6). The pre-process P that we used is described in Sec. 9.

Feature Statistics as a Prior

Before filling audio holes, the statistics of the signal may be estimated, using training. The statistics then serve as prior knowledge, when processing a pierced audio segment. See, as an example, D. Segev, Y. Schechner, and M. Elad, "Example-based cross-modal denoising," in Computer Vision and Pattern Recognition (CVPR), 2012 IEEE Conference on, June 2012, pp. 486-493, which is incorporated herein by reference in its entirety.

Speech is a major motivation for the present method. When listening to a familiar language, a strong prior is that some temporal sequences of syllables are highly probable (frequently appearing in words), while others much less so. The probability distribution of temporal syllable sequences is a prior, which can disambiguate speech under noise. However, syllable statistics is just a motivation in the present disclosure. In some embodiments, high-level division of audio sequences into syllables is avoided. Instead, low-level audio features in example segments may be used; training data is also used for learning a probability distribution of temporally consecutive segments.

The set of feature vectors $\tilde{E}_\tau$ undergoes clustering into C clusters (K-means algorithm is used for this). The proper number for C is debatable, as there are $O(10^4)$ potential syllable types. To reduce dimensionality in present experiments, a rule-of-thumb of the number of vowel×consonant combinations (in any order) was used, and then dictated C=300. However, in other embodiments, C may have a different value, for example between 150-200, 200-250, 250-299, 301-350, 350-400, 400-450 or above 450.

In this way, clusters of ABs are obtained. ABs in each cluster sound rather similar. ABs across clusters can efficiently be used in consecutive order to render speech.

Let the $k^{th}$ example AB belong to cluster $c_k = c(\tilde{e}_k)$. The probability of temporal transition between ABs that are conterminous (share a temporal boundary, with no overlap) is sought to be deduced. The example AB that is conterminous to $e_k$ is $e_{k+N_{stride}}$, where the integer $N_{stride}$ is the indexes difference between two conterminous ABs. Using FIG. 4 and earlier definitions of $N^{packets}$ and $N^{overlap}$ (the values of $N^{packets}$ and $N^{overlap}$ are set to satisfy the restriction of $N_{stride}$ being an integer), it is defined $$N^{stride} = \frac{N^{packets}}{N^{packets} - N^{overlap}}. \quad (11)$$

Figure 4:
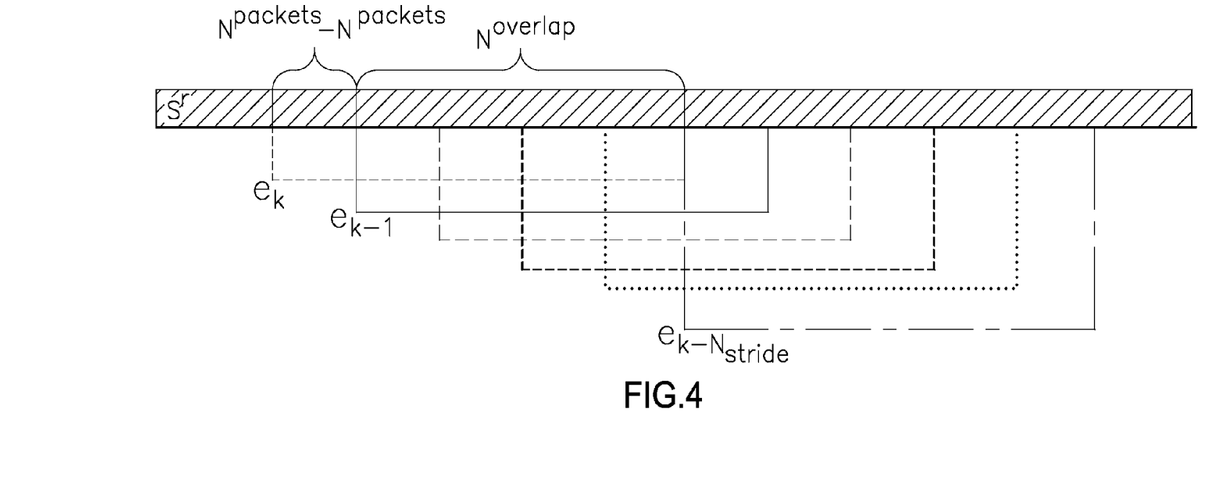
FIG. 4 shows a chart of AB stride size, in accordance with some embodiments.

FIG. 4 shows a chart of the AB stride size. Here, the example ABs length in packets is $N^{packets}=5$, while $N^{overlap}=4$. Therefore, $N^{stride}=5$.

The set of all consecutive ABs corresponding to fixed clusters q, $r \in [1, \ldots C]$ is $$\Phi_{q,r} = \{k | c_k = r \text{ AND } c_{k+N_{stride}} = q\} \quad (12)$$

The probability for a transition from cluster q to r is estimated from the histogram of these sets, $$P(q,r) = |\Phi_{q,r}|/N_E(\tau), \quad (13)$$

In a C×C matrix P, the (q,r) element is P(q,r). This matrix is a statistical prior that expresses the joint probability for consecutive signal ABs. The prior views signals as derived from a hidden Markov model (HMM).

Example Matching

Each hole in $s_r$ is matched with its most appropriate example in $E_\tau$. This match utilizes the unharmed data which surrounds the hole. This process is done separately for each hole, and begins by finding optional queries.

A. Query Selection

The set of optional queries for the $m^{th}$ hole (see FIG. 5) is defined as $$Q_m = \{q_n | m^{th} \text{hole} \subset q_n\}. \quad (14)$$

Figure 5:
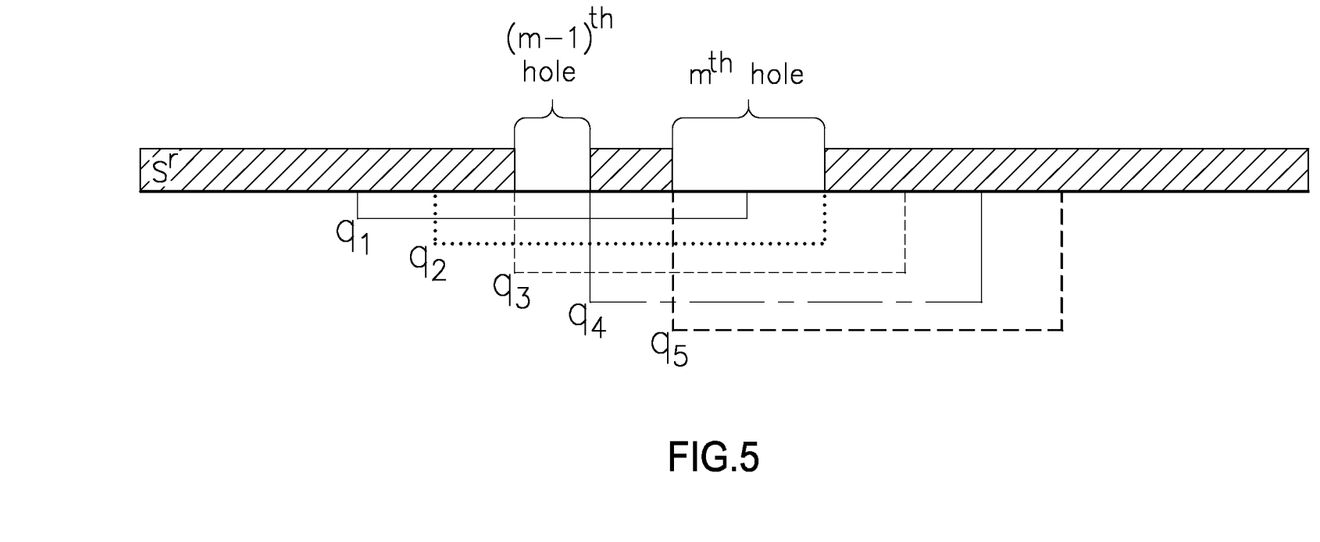
FIG. 5 shows optional queries for an $m^{th}$ hole, in accordance with some embodiments.

An AB query $q_n$ can include more than one continuous missing portion, as illustrated in FIG. 5 and Table 1 below:

| Query-Hole Correspondence | Query | | | | |
|---|---|---|---|---|---|
| | $q_1$ | $q_2$ | $q_3$ | $q_4$ | $q_5$ |
| Hole index m − 1 | • | • | • | | |
| m | | • | • | • | • |

Table 1 shows Optional queries for the $m^{th}$ hole, for $N^{packets}=5$ and $p_m=2$. Note that queries $q_2$ and $q_3$ also contain the previous hole. Therefore $q_2$ and $q_3$ appear in both sets $Q_{m-1}$ and $Q_m$. A bullet in a query-hole intersection of the table indicates this query is optional for this hole, meaning this query contains the hole in full.

The set $Q_m$ is heterogeneous. Within this set, we prefer valuable queries, which have better chance to match a suitable example. Therefore, we employ pruning, yielding a subset of valuable queries for the $m^{th}$ hole, $\overline{Q}_m \subseteq Q_m$. The reasons for the heterogenous nature of $Q_m$ and the pruning process are described further below.

B. Defining a Cost Function

Now it is sought to associate each query $\tilde{q}_n \in \overline{Q}_m$ with an example feature vector $\tilde{e}_k \in \tilde{E}_\tau$. This association, in some embodiments, satisfies two requirements:

1. The feature vectors $\tilde{e}_k$ and $\tilde{q}_n$ should be similar. This requirement is expressed by a Data (fidelity) term D in a cost function C, defined next.

2. Consistency with prior knowledge. Based on P, we derive the probability that $e_k$ appears between the two ABs which adjoin $q_n$ in $s_r$. This becomes a Regularization term R in C, defined in the following.

Putting together these two requirements is done by minimizing:

$$C(\tilde{q}_n, \tilde{e}_k) = D(\tilde{q}_n, \tilde{e}_k) + \lambda R(\tilde{q}_n, \tilde{e}_k), \quad (15)$$

where $\lambda$ weights the regularization (prior) relative to the data term. $\lambda$ will be returned to towards the end of this section.

1. Data term D: Assuming that examples and queries have high signal to noise ratio (SNR), similar feature vectors $\tilde{e}_k$ and $\tilde{q}_n$ indicate similarity (recall that $\tilde{q}_n$ is calculated using only $q_n^{int}$. Hence SNR and vector similarity are measured using only $q_n^{int}$ and its corresponding portions in $e_k$) between $e_k$ and $q_n$. Hence, for each query feature vector $\tilde{q}_n \in \overline{Q}_m$, a distance grade $D(\tilde{q}_n, \tilde{e}_k)$ is calculated $\forall e_k \in E_\tau$.

2. Regularization term R: Query $q_n$ is conterminous to preceding and consecutive ABs, denoted respectively by $AB_n^{prec}$ and $AB_n^{cons}$. Suppose $q_n$ is replaced by example $e_k$. This yields a sequence of ABs:

$$AB_{n,k}^{seq} = [AB_n^{prec}, e_k, AB_n^{cons}]. \quad (16)$$

This corresponds to a sequence of the clusters $$c_{n,k}^{seq} = [c_n^{prec}, c_k, c_n^{cons}], \quad (17)$$

where $c_n^{prec}$ and $c_n^{cons}$ are the clusters of $AB_n^{prec}$ and $AB_n^{cons}$, respectively. This sequence has prior probability. A sequence of clusters is a Markov process, hence $$P(c_{n,k}^{seq}) = P(c_n^{prec}, c_k) P(c_k, c_n^{cons}). \quad (18)$$

We use the Markovian nature of sequence $c_{n,k}^{seq}$ to induce a cost:

$$\omega(AB_{n,k}^{seq}) = -\log P(c_{n,k}^{seq}). \quad (19)$$

Using Eqs. (18, 19) the final regularization term is $$R(\tilde{q}_n, \tilde{e}_k) = -\log P(c_n^{prec}, c_k) - \log P(c_k, c_n^{cons}). \quad (20)$$

A low probability transition sequence between ABs induces a high cost, while a highly likely transition induces little cost. Once the data and regularization terms are defined, finding the best match for the $m^{th}$ hole is a process that yields a pair $(e_m^{best}, q_m^{best})$. This pair comprises the example AB $e_k \in E_\tau$ which best matches query $q_n \in \overline{Q}_m$. The following list describes how this pair is found for the $m^{th}$ hole:

1. Calculate $D(\tilde{q}_n, \tilde{e}_k) \forall \tilde{q}_n \in \overline{Q}_m$ and $\tilde{e}_k \in E_\tau$. This yields a table like Table 2, which shows query-example distances. Values represent the distance between $\tilde{e}_k$s (rows) and $\tilde{q}_n$s (columns). For each query column, distance ranks (in ascending order) appear in brackets. Examples distance values ranked up to $N^{cand}$ appear in bold:

| Distance (rank#) | | $\tilde{q}_n \in \overline{Q}_m$ | | |
| --- | --- | --- | --- | --- |
| | | $q_{17}$ | $q_{19}$ | $q_{20}$ |
| $\tilde{e}_k \in E_\tau$ | $\tilde{e}_1$ | 253 (#78) | 152 (#35) | 124 (#31) |
| | $\tilde{e}_2$ | 486 (#320) | 872 (#1053) | 531 (#152) |
| | . | . | . | . |
| | . | . | . | . |
| | . | . | . | . |
| | $\tilde{e}_{103}$ | 116 (#35) | 515 (#334) | 778 (#687) |
| | $\tilde{e}_{104}$ | 576 (#325) | 60 (#7) | 306 (#39) |
| | . | . | . | . |
| | . | . | . | . |
| | . | . | . | . |

2. $\forall \tilde{q}_n \in \overline{Q}_m$ keep the $N^{cand} \tilde{e}_k$s $\in E_\tau$ with the smallest distance. This yields a candidate pairs set $$Cp_n = \{(\tilde{q}_n, \tilde{e}_k) | \text{rank}(D(\tilde{q}_n, \tilde{e}_k)) \leq N^{cand}\}. \tag{21}$$

3. Merge the sets into one set for the $m^{th}$ hole:

$$Cp_m = \bigcup_{\{n | \tilde{q}_n \in \overline{Q}_m\}} Cp_n. \tag{22}$$

4. Calculate $R(\tilde{q}_n, \tilde{e}_k)$ for all pairs $(\tilde{q}_n, \tilde{e}_k) \in Cp_m$.
5. Using Eq. 15, obtain the best matching pair by $$(\tilde{q}_m^{best}, \tilde{e}_m^{best}) = \underset{(\tilde{q}_n, \tilde{e}_k) \in Cp_m}{\text{argmin}} \{C(\tilde{q}_n, \tilde{e}_k)\}. \tag{23}$$

6. Return the example-query pair $(e_m^{best}, q_m^{best})$ corresponding to the feature vectors pair $(\tilde{q}_m^{best}, \tilde{e}_m^{best})$.

For the minimization step in Eq. 23, the value of $\lambda$ in Eq. (15) needs to be determined. This value balances the weight between the data and regularization terms. The average magnitude of data term D varies across different holes, while the average magnitude of R remains constant. Therefore, in order to maintain a constant weighting of the two terms D and R, it is defined $$\lambda = \overline{\lambda} d_m^{median}, \tag{24}$$

where $$d_m^{median} = \underset{\tilde{q}_n \in \overline{Q}_m, \tilde{e}_k \in \overline{E}_\tau}{\text{median}} \{d(\tilde{q}_n, \tilde{e}_k)\}. \tag{25}$$

Once Eq. (24) is incorporated into Eq. (15), fixing $\overline{\lambda}$ to a desirable value determines the balance between the two terms.

Rendering an Impainted Soundtrack

Once the cost function C is minimized and the matching couple $e_m^{best}$ and $q_m^{best}$ is found for each hole, a restored audio signal $\hat{s}$ is synthesized. The synthesis process may be divided to multiple stages:
Pitch Modification Spoken syllables can be roughly divided to unvoiced and voiced. Voiced syllables have a fundamental acoustic frequency (pitch). The pitch can vary between different occurrences of the syllable, due to intonation. The present example-matching algorithm is insensitive to intonation changes due to normalizations (described later in Sec. 9). Therefore, $e_m^{best}$ can have inconsistent pitch with $q_m^{best}$. The pitch of $e_m^{best}$ is thus modified following the pitch detection project of N. Seo. (2008, April) Project: Pitch detection. [Online]. Available: http://note.sonots.com/SciSoftware/Pitch.html, yielding a modified example $e_m^{mp}$, whose pitch is consistent with that of $q_m^{best}$ (see FIG. 5):

$$e_m^{mp} = PM(e_m^{best} | q_n^{best}). \tag{26}$$

Only signal parts classified as voiced are modified. Classification to voiced and unvoiced may be done by thresholding a pitch confidence value.

Figure 6:
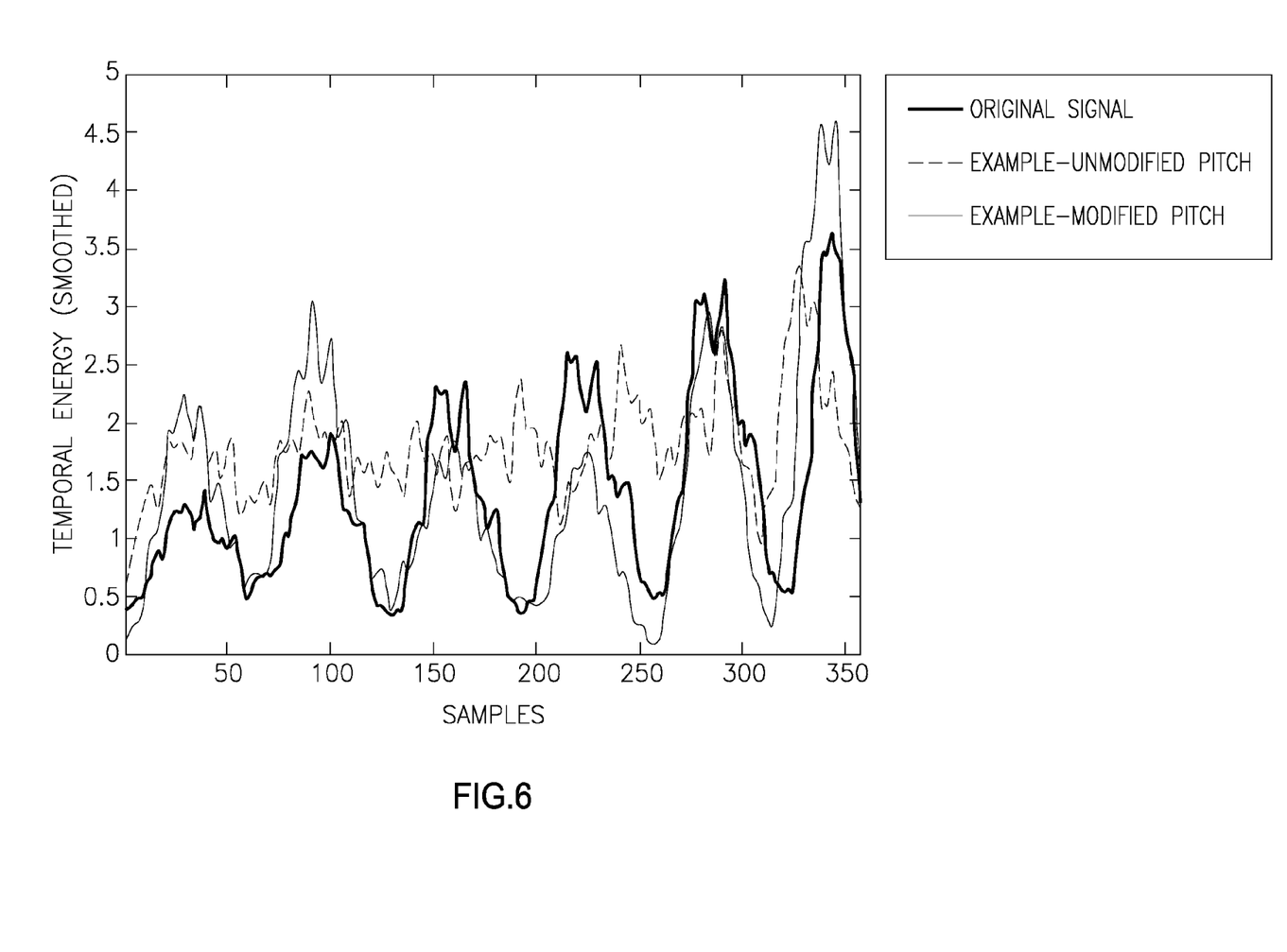
FIG. 6 shows a graph of example pitch modification, in accordance with some embodiments.

FIG. 6 shows a graph of example pitch modification of syllable 're'. Example $e_m^{best}$ (dashed line) has different pitch than the original corresponding portion in $s^{org}$ (solid line). Thus $e_m^{best}$'s pitch is modified to match the pitch of $q_m^{best-int}$, yielding $e_m^{mp}$ (dash-dotted line).
Gain Modification Different occurrences of the same syllable also vary in their gain (volume). As with intonation, the present example-matching algorithm is optionally gain-invariant. Therefore, $e_m^{mp}$ can have inconsistent gain with $q_m^{best}$. Thus $e_m^{mp}$ is amplified to match the energy of $q_m^{best-int}$ (i.e. the intact portions of $q_m^{best}$), yielding $e_m^{mpg}$.

Example Timing Fine Tuning

The present algorithm uses a 'coarse to fine' approach. Recall that each hole is first paired with a coarsely matching example. Then there is refinement, by temporally aligning $e_m^{mpg}$ to the hole. For this fine temporal alignment, the features of coarse matching are not used. Instead, temporal alignment may be achieved by comparing waveforms. The waveform of $e_m^{mpg}$ is compared with that of $q_m^{best-int}$, in order to find the temporal alignment yielding highest correlation. It is assumed that the waveform of $e_m^{mpg}$ resembles the original waveform $s^{org}$ in the hole's vicinity.

Figure 7:
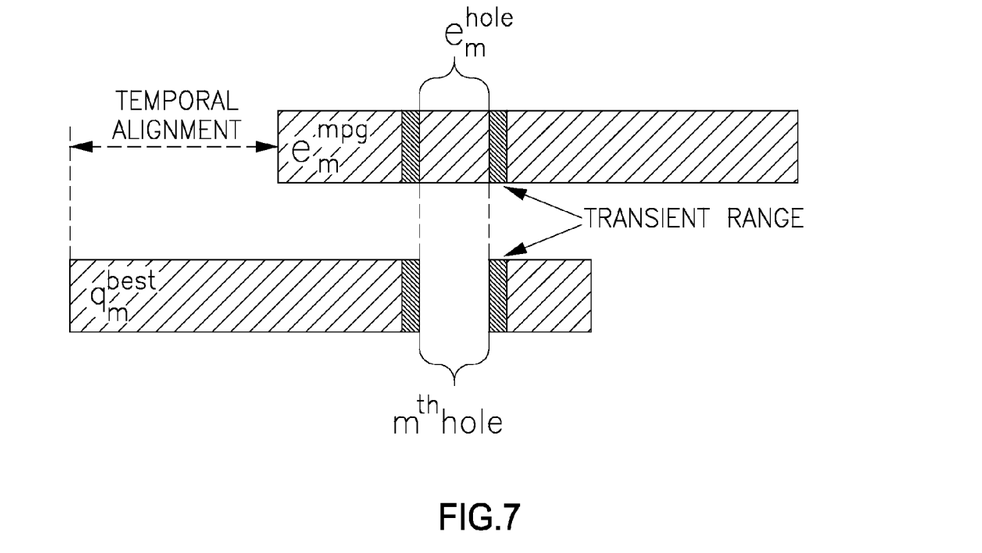
FIG. 7 shows a chart of inlaying feature vectors for synthesizing a corrected signal, in accordance with some embodiments.

Since some of the data in $q_m^{best}$ is intact, only the missing portion of it is filled in. This missing portion corresponds to a certain portion in $e_m^{mpg}$, denoted $e_m^{hole} \subset e_m^{mpg}$ (see FIG. 7). FIG. 7 shows a chart of inlaying $e_m^{mpg}$ to synthesize $\hat{s}$. Audio sequence $e_m^{mpg}$ is temporally aligned with $q_m^{best}$. The portion in $e_m^{mpg}$ corresponding to the hole is $e_m^{hole}$. An adjacent temporal range on both sides of $e_m^{hole}$ is used for the transient phase, together with the corresponding ranges in $q_m^{best}$.
Optimal Coupling Timing Synthesizing $\hat{s}$ can apparently be done by replacing the pierced segments of $s^r$ with $e_m^{hole}$. However, this generally causes discontinuities in the waveform, resulting in annoying audible artifacts. In order to avoid these discontinuities, the transition between $s^r$ and $e_m^{hole}$ is done gradually. A weighting function may be used to fade out signal $s^r$, while fading in $e_m^{hole}$, and vice versa. Optimal coupling, such as in D. T. Chappell and J. H. Hansen, "A comparison of spectral smoothing methods for segment concatenation based speech synthesis," Speech Communication, vol. 36, no. 34, pp. 343-373, 2002, incorporated herein by reference in its entirety, may be used to determine the best transition timing (within a limited range) according to a spectral smoothness criterion.

Figure 8:
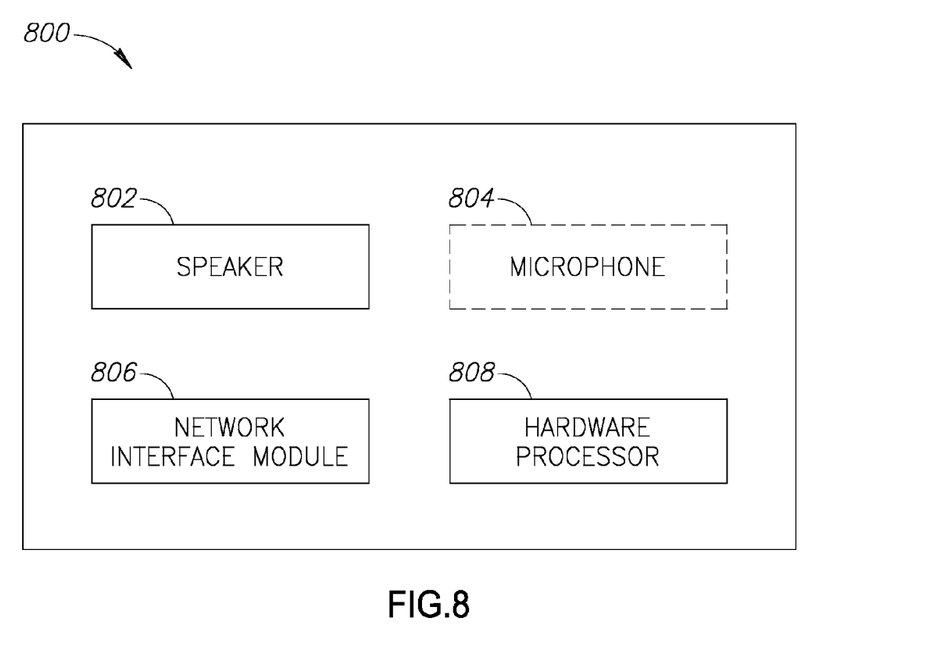
FIG. 8 shows a block diagram of an apparatus, in accordance with some embodiments.

Reference is now made to FIG. 8, which shows an apparatus 800 configured to carry out the present method, in accordance with some embodiments. Apparatus 800 may be a computing device adapted at least for receiving a digital audio stream over a network. Optionally, apparatus 800 is also adapted to transmit a digital audio stream, namely—it may allow for bi-directional (or multi-directional) VoIP teleconferences. Apparatus 800 may be, for example, a portable telephone, a smart phone, a notebook computer, a tablet computer, a desktop computer and/or the like.

In some embodiments, apparatus 800 includes a speaker 802, a network interface module 806 and a hardware processor 808. Network interface module 806 may be a hardware device, such as a network interface card, a network chip and/or the like, configured to receive and optionally to transmit digital data, such as digital audio streams.

Hardware processor 808 may be a discrete central processing unit (CPU) or be a device combined with network interface module 806—for example an integrated circuit including both functionalities (commonly referred to as a "system on a chip" or "SoC"). Hardware processor 808 may be configured to control data reception and/or transmission by network interface module 806, as well as to conduct any processing needed to carry out the present method or at least a portion thereof.

Speaker 802, a device configured to transduce electrical signals to acoustic signals, may be operatively coupled to hardware processor 808, for example via an audio circuitry (not shown). When hardware processor 808 finishes filling the gap in the digital audio stream, it may utilize speaker 802 for sounding a restored digital audio signal.

In some embodiments, apparatus 800 may also include a microphone 804, for transmitting audio outside of the apparatus. This may be useful if apparatus 800 is to be utilized for bi-directional (or multi-directional) VoIP teleconferencing. If microphone 804 is present, it may be operatively coupled to hardware processor 808 via the aforementioned audio circuitry or via a different audio circuitry.

Unless specifically stated otherwise, as apparent from the above discussions, it is appreciated that throughout the specification discussions utilizing terms such as "processing", "computing", "calculating", "determining", or the like, refer to the action and/or process of a computing system or a similar electronic computing device, that manipulate and/or transform data represented as physical, such as electronic, quantities within the computing system's registers and/or memories into other data similarly represented as physical quantities within the computing system's memories, registers or other such.

Some embodiments may be implemented, for example, using a computer-readable medium or article which may store an instruction or a set of instructions that, if executed by a computer (for example, by a hardware processor and/or by other suitable machines), cause the computer to perform a method and/or operations in accordance with embodiments of the invention. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), flash memories, magnetic or optical cards, or any other type of media suitable for storing electronic instructions, and capable of being coupled to a computer system bus.

The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, such as C, C++, C#, Java, BASIC, Pascal, Fortran, Cobol, assembly language, machine code, or the like.

Harnessing Visual Data

In addition to audio, video applications, such as video conference data, also convey visual data. This usually includes a live video of the face of the speaking person. This visual data, or at least the intact portion (frames or even a part of a frame) thereof which is available for the corresponding harmed audio segments, may be harnessed to further improve inpainting results. Features extracted from visual data can optionally also be taken into account when searching for the best previously captured audio-visual segment. That is, it is assumed that there is at least some association between the visual (video frames) and the auidible (audio data). These visual features may then be added to the audio features extracted from segments adjacent to the audio gap. In this scenario, it is assumed that there is no visual data gap corresponding to the audio data gap. Therefore, visual features have an even greater role, as they can be extracted for the whole audio-visual signal, including those areas which lack the audio information.

Extraction of video features may be performed in a number of way. As one example, 3D Discrete Cosine Transform (DCT) may be used. In this method, the video may be stabilized, so that the lips area of the speaker remain in approximately the same area across consecutive video frames. Then, the lips area may be cropped for further processing; 3D DCT may be applied to multiple consecutive frames comprising the lips area. The 3D, in this sense, is comprised of the two dimensional array of pixels in each frame, as well as the time dimension.

As another example, one or more facial tracking algorithms may be used for video feature extraction. The facial tracking algorithm, when fed with a video of a person speaking, may return 2D or even 3D coordinates of multiple points on the speaker's face. These points may even extend beyond the lips, for example showing changes in various facial muscles due to expression of certain syllables.

Once visual features were extracted for both queries and previously captured examples, the matching process is done in a similar way to what previously described for the audio only case. For further discussion of visual feature extraction, see Segev et al. (id.). Then, the chosen example is inlayed to fill the gap, as previously described.

Experimental Results

First, a VoIP conversation was simulated. A simple camcorder was used to record audio at 8 KHz. The spoken content was a text of a known children story, M. W. Brown and L. Weisgard, Red light, green light. Scholastic Inc., 1992. The recorded audio is $s^{org}$. Then, $s^{org}$ was pierced at random locations, to create $s^r$. This simulates a typical packet dropping scenario. Some parts of $s^{org}$ were not pierced at all, simulating time periods without any packets dropped.

Holes pierced in $s^r$ cause degradation in perceived audio quality, which can be measured by the mean opinion score (MOS) test, defined in International Telecommunication Union. ITU-T P.862. [Online]. Available: http://www.itu.int/rec/T-REC-P.862/, which is incorporated herein by reference in its entirety. This test is widely accepted as a measure of speech quality assessment. It asks participants to asses the quality of a given audio segment by rating the level of audio impairment in this segment from 'very annoying' (meaning bad quality, graded 1) to 'imperceptible' (meaning excellent quality, graded 5).

In the experiments, different versions of synthesized s were compared. Different configurations of the present method were compared with the following known simple PLC methods, all applied on the same pierced s'':
1. Filling the gap with silence—This is the most trivial method, in which audio gaps are left as periods of silence.
2. Filling the gap with white noise—Audio data gaps are replaced by white noise. It's variance is set to match the signal's energy in the hole's vicinity.
3. Filling the gap by repeating the audio segment preceding the gap—A $p_m$ packets long gap is repeating the preceding audio packet $p_m$ times.

These methods are based, inter alia, on J. Suzuki and M. Taka, "Missing packet recovery techniques for low-bit-rate coded speech," Selected Areas in Communications, IEEE Journal on, vol. 7, no. 5, pp. 707-717, June 1989.

The present method was tested using either $N_{packets}=7$ or $N_{packets}=10$. The length of simulated holes was limited to $p_m \leq 6$, which complies with the limitation in Eq. 9. The number of final AB candidate example $N^{cand}$ was empirically chosen to be 40, and the balance term between the regularization and data terms in Eq. 15 was set to $\lambda=0.2$.

Furthermore, the present method which harnesses visual data, as discussed above, was tested, both by using 3D DCT (over 7 consecutive frames) and, in the alternative, by using a facial tracking algorithm called "FaceTracker" available online at https://github.com/kylemcdonald/FaceTracker (Saragih et al. 2010, Python wrapping by Amit Aides). The FaceTracker test returned, in response to feeding it with 7 video frames, the 3D coordinates of 65 points on the speaker's face. Ten points, positions at and around the lips area, were utilized in the test in order to extract the following five parameters: vertical aperture, horizontal aperture, lips perimeter, lips area and lips roundness, The MOS of each of these configurations appears in Table 3:

| Holes filled using: | MOS |
|---|---|
| silence | 1.46 |
| white noise | 1.57 |
| repeat last segment | 1.2 |
| audio inpainting, $N_{packets}=7$ | 2.8 |
| audio inpainting, $N_{packets}=10$ | 3 |
| audio impaining with video data | 3.25 |
| original audio, unharmed | 4.58 |

Table 3 shows the mean opinion score (MOS) for different configurations. Scores vary between 1 (bad audio quality) and 5 (excellent audio quality). The present audio inpainting method is compared with three common PLC methods. MOS for two different configurations of our methods is presented.

Audio Features

As the present method was demonstrated in speech signals, features which incorporate perceptually distinguishable speech audio features were used. The mel frequency cepstral coefficients (MFCC) are known to properly express the perceptual measure of a stationary speech signal. The following is an outline of the audio features extraction process, followed by a more detailed description:
1. Divide each audio signal $e_k$ into $N_T$ audio tiles.
2. Calculate the $N_T$ row-vectors $f_t$, each having $N_{MFCC}$ frequency band coefficients.
3. Normalize the coefficients in each frequency band by its mean value.
4. Subtract the value of the lower band coefficient from each of the MFCCs (except for the first).
5. Concatenate the $N_T$ audio tiles' coefficients of the AB.

As speech is generally not stationary throughout the temporal extent of an AB, we divide each AB into $N_T$ brief consecutive tiles (step 1), each indexed by t. Per tile t, the MFCCs yield a feature row-vector $f_t$. Each row-vector $f_t$ comprises $N_{MFCC}$ coefficients, corresponding to $N_{MFCC}$ frequency bands:

$$f_t = \{f_{t,b}\}_{b=1}^{N_{MFCC}}. \qquad (27)$$

In order to further adapt these features to a speech scenario, the coefficients calculation is done on the lower frequencies of the signal (up to 2 KHz in this case). As mentioned in the outline, the calculated MFCC coefficients undergo several normalization steps. These steps improve the ability of a feature vector represent ABs' similarity:

In step 3, the mean value of each MFCC band, calculated over all the full audio sequence, is subtracted from this band's raw coefficients:

$$f_{t,b}^{Intensity\_Normalized} = f_{t,b}^{raw} - \underset{f_b \in s^r}{mean}\{f_b\}. \qquad (28)$$

The MFCCs are calculated by taking the logarithmic values of the spectrogram, and therefore we use subtraction and not division for normalization.

This emphasizes the similarity of two audio tiles which only differ in their intensity level (e.g. when the same syllable is uttered in different intensities), thus making features intensity insensitive.

In step 4 we subtract from each frequency band coefficient (except for the lowest frequency band) the preceding band's coefficient:

$$f_{t,b} = f_{t,b}^{Intensity\_Normalized} - f_{t,b-1}^{Intensity\_Normalized},$$
$$b = 2 \ldots N_{MFCC} \qquad (29)$$

This makes features more sensitive to the tile's spectral shape, rather than to its coefficients' values.

Query Pruning

As mentioned above, the set of optional queries for the $m^{th}$ hole, $Q_m$, undergoes a pruning process which yields the reduced set of queries with a higher chance of finding a correct example match, $\overline{Q}_m$.

Heterogeneity within $Q_m$ stems from two main reasons:
1. In each query there are silent and non-silent segments. In silent segments, the source of interest does not generate an audio signal. Therefore they mainly contain noise, which is independent of the source of interest. Classification of a segment as silent or non-silent is done by putting a threshold on the local temporal energy of the segment, assuming that segments with high signal energy correspond to non-silent ones. This is based on the assumption of a relatively high SNR audio signal.

By definition, the best match in regard to the source of interest is sought, and hence it is preferred to have less silent segments, which will degrade the matching process's performance.

2. Each query in $Q_m$ has a certain number of missing packets. Variations occur when two holes are close to each other (as demonstrated in FIG. 1). In such cases, some of the queries in $Q_m$ contain (even partially) a neighboring hole, while others are only pierced by the $m^{th}$ hole itself. Generally, queries which have less pierced segments for a certain hole are preferred (e.g. queries $q_4$ and $q_5$ for the $m^{th}$ hole in FIG. 5), as this provides more grounds for comparison.

Let $N_m^{significant}$ be the number of segments in query $q_m$ which are both classified as non-silent and correspond to non missing packets. We define $$N_{m_{max}}^{significant} = \max_{q_m \in Q_m} \{N_m^{significant}\}, \quad (30)$$

and use it to define the pruned set of queries for the $m^{th}$ hole as $$\overline{Q}_m = \{q_m \in Q_m | N_m^{significant} = N_{m_{max}}^{significant}\}. \quad (31)$$

i.e. the subset of queries within $Q_m$ which share the maximal amount of significant data.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for packet loss concealment, comprising:
    continuously receiving a digital audio stream that comprises speech of a user;
    extracting audio features from the digital audio stream while the digital audio stream is unharmed; and
    upon detecting a gap in the digital audio stream, filling the gap with one or more previous segments of the digital audio stream, to produce a perceptually-acceptable digital audio output having a mean opinion score (MOS) of 2.5 or more, wherein said filling is based on a matching of extracted audio features of the one or more previous segments with one or more audio features adjacent to the gap.

2. The method according to claim 1, wherein said matching is based on prior statistics of the digital audio stream.

3. The method according to claim 2, wherein the prior statistics comprise a probability distribution of temporal syllable sequences.

4. The method according to claim 1, further comprising dividing the digital audio stream into consecutive segments.

5. The method according to claim 4, wherein the consecutive segments are partially-overlapping.

6. The method according to claim 4, further comprising clustering the consecutive segments, wherein said clustering is to a number of clusters based syllable types.

7. The method according to claim 6, wherein the number of clusters is between 250 and 350.

8. The method according to claim 4, further comprising dividing each of the consecutive segments into audio tiles according to mel frequency cepstral coefficients (MFCC).

9. The method according to claim 1, wherein said filling of the gap comprises synthesizing a restored digital audio signal by adjusting pitch and gain values of the one or more audio features adjacent to the gap.

10. The method according to claim 9, wherein said synthesizing further comprises preventing discontinuities in the restored digital audio signal by synthesizing a gradual transition at edges of the gap.

11. The method according to claim 1, wherein:
    said digital audio stream is comprised within a digital video stream;
    the method further comprises extracting visual features from the digital video stream; and
    said filling is further based on a matching of the one or more of the extracted visual features with one or more of the extracted audio features.

12. An apparatus comprising:
    a speaker;
    a network interface module; and
    at least one hardware processor configured to:
    (a) continuously receive a digital audio stream using said network interface module, wherein the digital audio stream comprises speech of a user,
    (b) extract audio features from the digital audio stream while the digital audio stream is unharmed,
    (c) upon detecting a gap in the digital audio stream, synthesize a restored digital audio signal by filling the gap with one or more previous segments of the digital audio stream wherein said filling is based on a matching of the extracted audio features of the one or more previous segments with one or more audio features adjacent to the gap, and
    (d) sounding the restored digital audio signal using said speaker, wherein the restored digital audio signal is perceptually-acceptable and has a mean opinion score (MOS) of 2.5 or more.

13. The apparatus according to claim 12, wherein said matching is based on prior statistics of the digital audio stream, the prior statistics comprising a probability distribution of temporal syllable sequence.

14. The apparatus according to claim 12, wherein said at least one hardware processor is further configured to divide the digital audio stream into partially-overlapping consecutive segments.

15. The apparatus according to claim 14, wherein said at least one hardware processor is further configured to cluster the consecutive segments, wherein the cluster is to a number of clusters based syllable types.

16. The apparatus according to claim 12, wherein said filling of the gap comprises synthesizing the restored digital audio signal also by adjusting pitch and gain values of the one or more audio features adjacent to the gap, and preventing discontinuities in the restored digital audio signal by synthesizing a gradual transition at edges of the gap.

17. The apparatus according to claim 12, wherein
    said digital audio stream is comprised within a digital video stream;
    said at least one hardware processor is further configured to extract visual features from the digital video stream; and
    said filling is further based on a matching of the one or more of the extracted visual features with one or more of the extracted audio features.

18. A method for packet loss concealment, comprising using at least one hardware processor for filling a gap in a digital audio stream with previously received audio of the digital audio stream, to produce a perceptually-acceptable digital audio output that has a mean opinion score (MOS) of 2.5 or more,
  wherein said filling is based on feature matching between audio adjacent to the gap and the previously received audio, and
  wherein the digital audio stream comprises speech of a user.

\* \* \* \* \*